United States Patent [19]

Molnar et al.

[11] Patent Number: 5,895,994
[45] Date of Patent: Apr. 20, 1999

[54] DYNAMOELECTRIC MACHINE

[75] Inventors: David T. Molnar, Cuyahoga Falls, Ohio; Robert K. Hollenbeck, Fort Wayne, Ind.

[73] Assignee: General Electric Company, Schenectady, N.Y.

[21] Appl. No.: 08/829,734

[22] Filed: Mar. 31, 1997

Related U.S. Application Data

[63] Continuation-in-part of application No. 08/791,116, Jan. 30, 1997.

[51] Int. Cl.$^6$ .................................................. H02K 3/34
[52] U.S. Cl. ............... 310/215; 310/67 R; 310/68 R; 310/68 B; 310/71; 310/194; 310/217
[58] Field of Search ............... 310/43, 68 R, 310/68 B, 67 R, 71, 194, 217, 259, DIG. 3

[56] References Cited

U.S. PATENT DOCUMENTS

| | | | |
|---|---|---|---|
| 3,122,667 | 2/1964 | Baciu | 310/45 |
| 3,334,255 | 8/1967 | Peters | 310/215 |
| 4,038,573 | 7/1977 | Hillyer et al. | 310/71 |
| 4,340,829 | 7/1982 | McCoy | 310/71 |
| 4,481,435 | 11/1984 | Loforese | 310/71 |
| 4,728,836 | 3/1988 | Wrobel | 310/71 |
| 4,934,041 | 6/1990 | Hoover et al. | 29/596 |
| 4,961,017 | 10/1990 | Kakimoki et al. | 310/71 |
| 5,006,744 | 4/1991 | Archer et al. | 310/89 |
| 5,306,976 | 4/1994 | Beckman | 310/215 |
| 5,675,206 | 10/1997 | Horski | 310/268 |

FOREIGN PATENT DOCUMENTS

| | | |
|---|---|---|
| 924.292 | 7/1947 | France . |
| 31 50 970 | 6/1983 | Germany . |
| 693310 | 8/1965 | Italy . |

OTHER PUBLICATIONS

GE SME44 Motor Assembly, admitted prior art, see description and drawings attached.

*Primary Examiner*—Thomas M. Dougherty
*Assistant Examiner*—Thanh Lam
*Attorney, Agent, or Firm*—Senniger, Powers, Leavitt & Roedel; Wayne O. Traynham

[57] ABSTRACT

A dynamoelectric machine has a stator end cap mounted on a stator core, which attaches a control circuit board directly onto the stator. The end cap has integrally formed fingers which permit snap on connection of the circuit board. Guide pins make certain the circuit board is oriented properly upon connection to the end cap. The end cap also has wire fixtures which hold winding leads of a winding and permit insulation displacement terminals on the circuit board to plug into the winding leads and achieve electrical contact at the same time the circuit board is mounted on the end cap. Hall devices mounted onto the circuit board are guided into pockets formed on teeth of the stator end cap for precise location. The end cap is constructed to shield the winding from contact with the motor shell. In addition, backward curved fans are employed to reduce mechanical noise in the direction of high speed rotation.

33 Claims, 5 Drawing Sheets

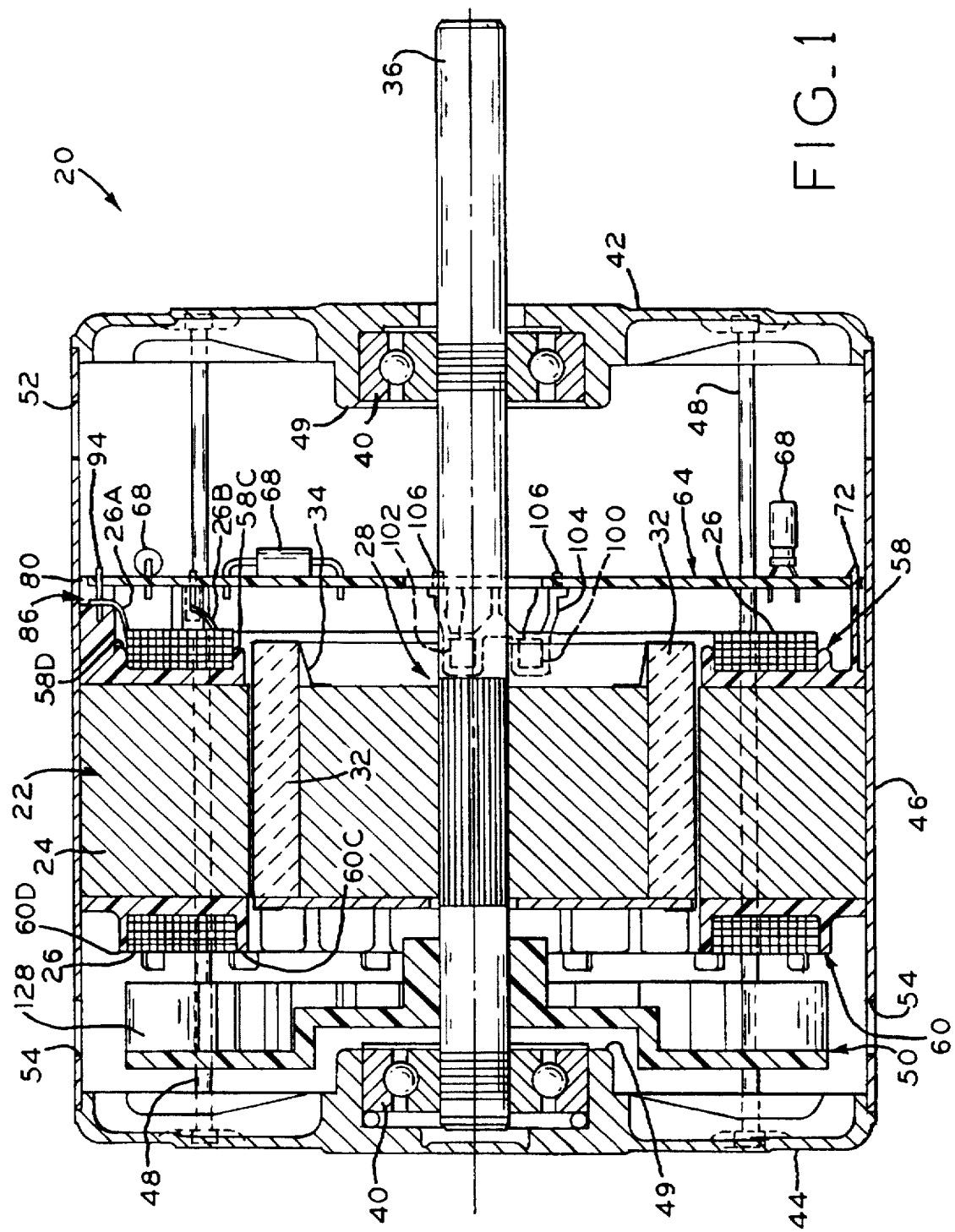

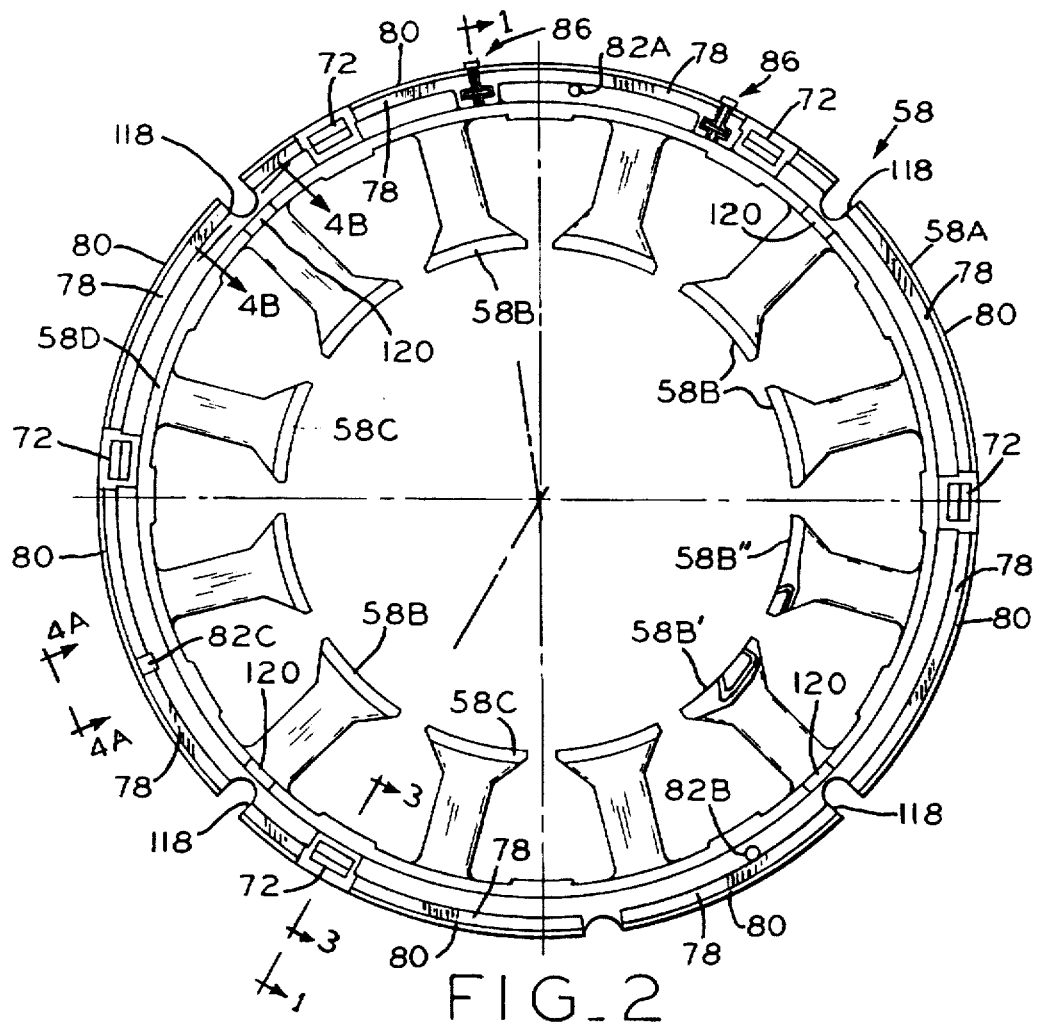
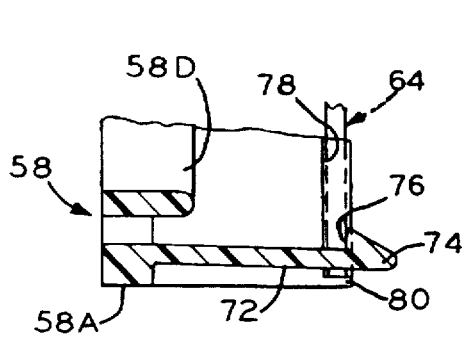
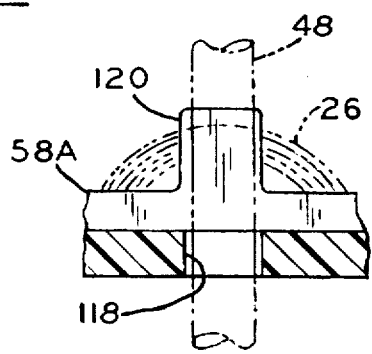
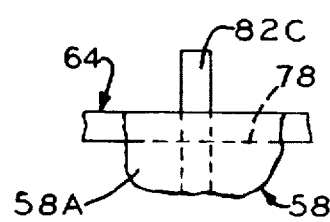
FIG_2
FIG_3
FIG_4A
FIG_4B

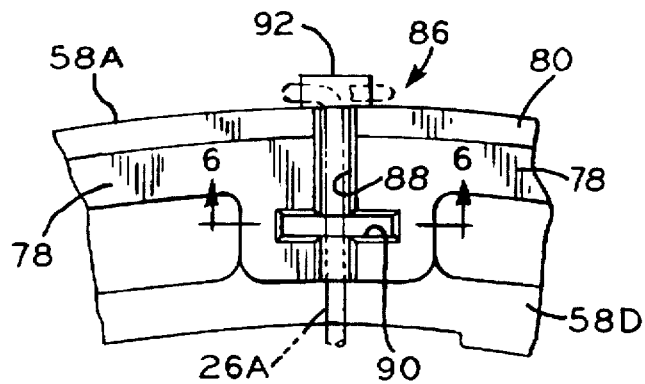
FIG_5
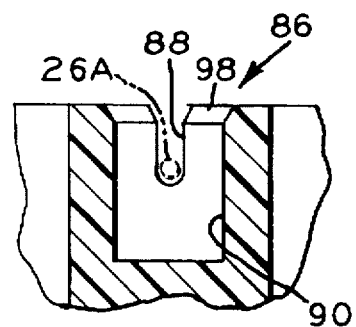
FIG_6
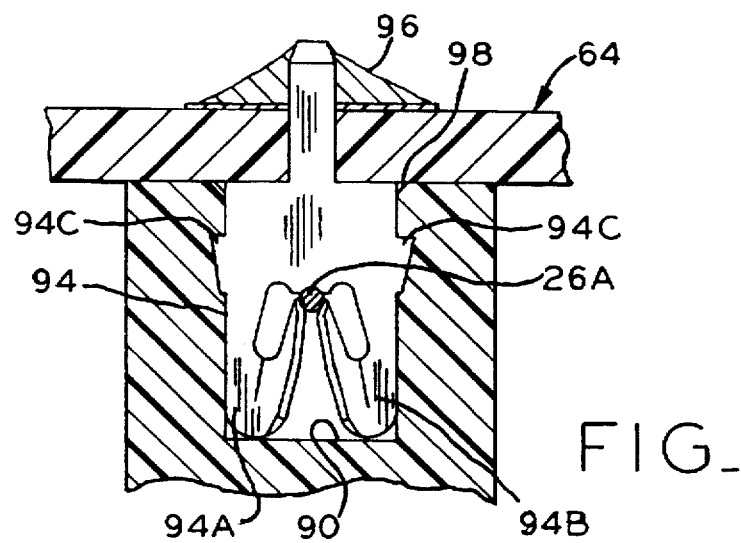
FIG_7
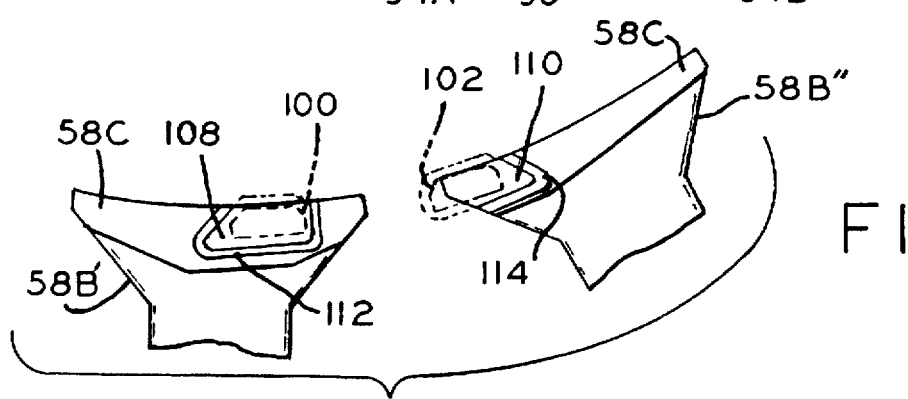
FIG_8

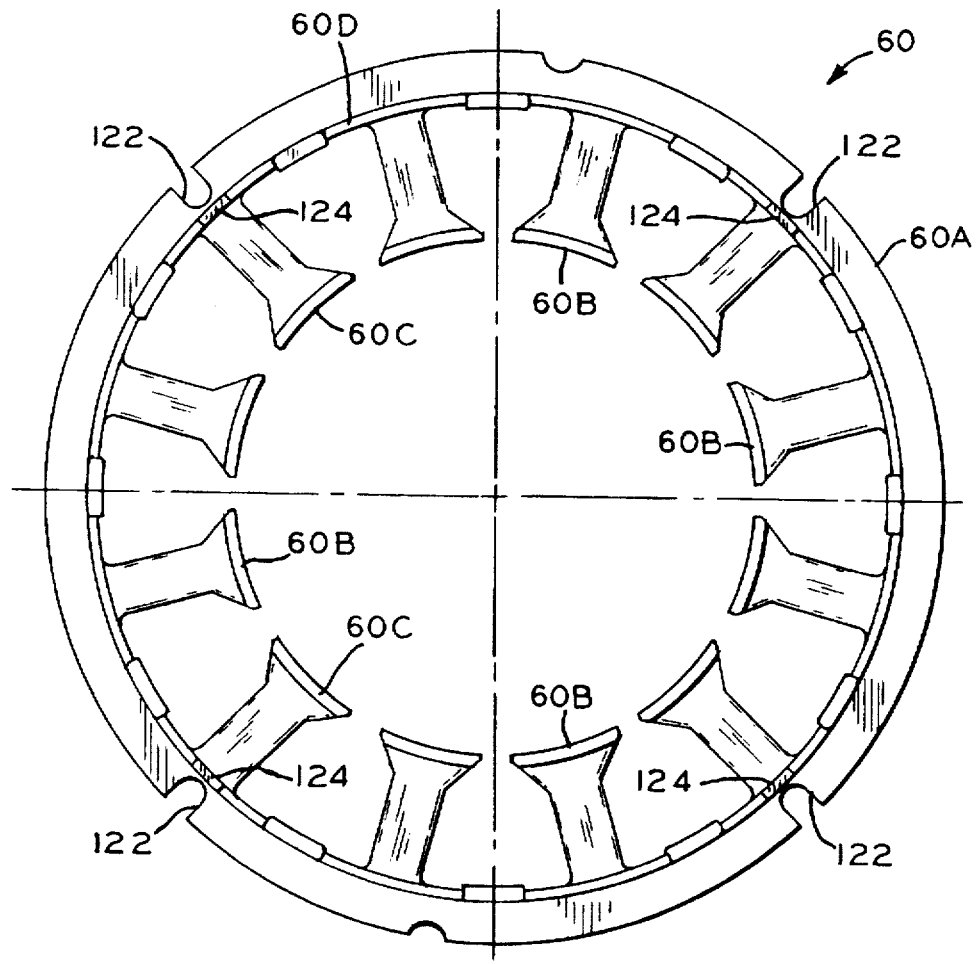
FIG_12
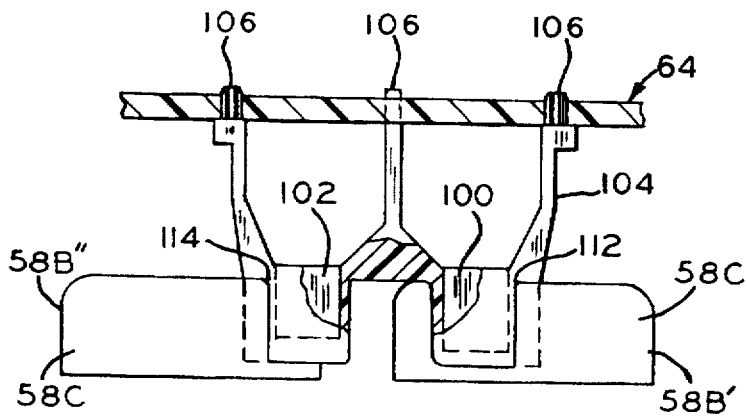
FIG_9

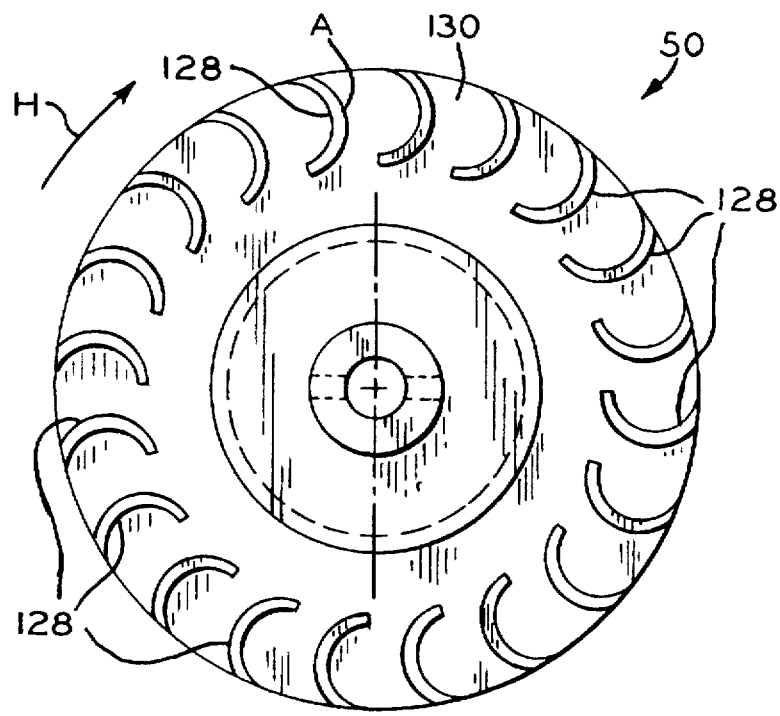
FIG_10
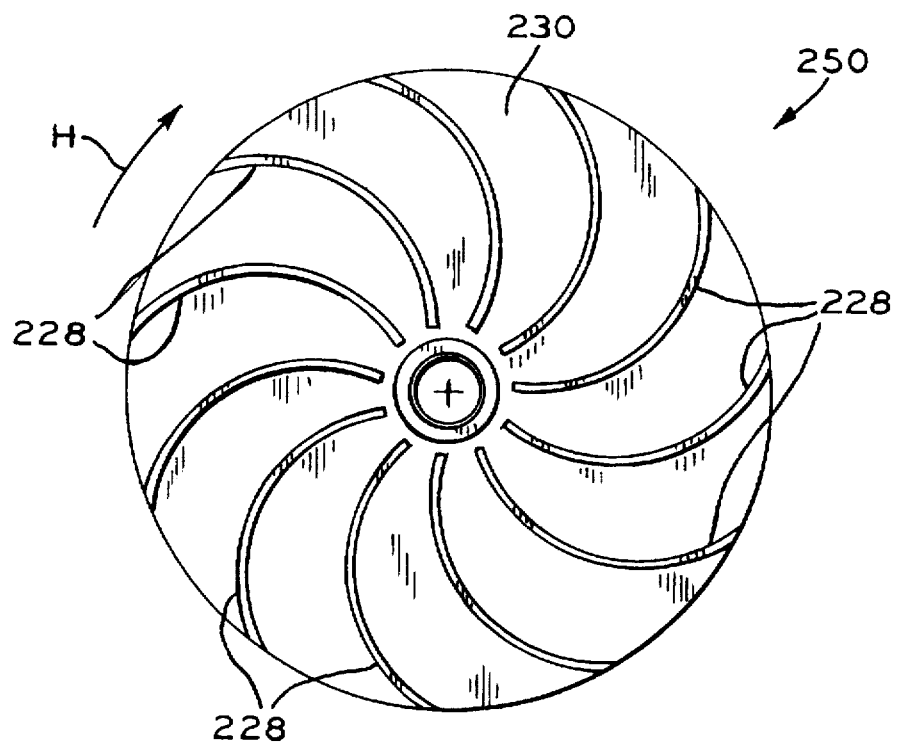
FIG_11

DYNAMOELECTRIC MACHINE

This is a continuation-in-part of U.S. patent application Ser. No. 08/791,116, filed Jan. 30, 1997.

BACKGROUND OF THE INVENTION

This invention relates generally to dynamoelectric machines and more particularly to a stator and fan for a dynamoelectric machine.

Dynamoelectric machines, in the form of electric motors, have numerous applications, such as for washing machine and compressor motors. An important part of the utility of the motor is that it can be manufactured inexpensively and yet provide a reliable, long lasting, quiet, low maintenance engine for an appliance or other machine. Thus, there is a need for a motor which can be easily and rapidly assembled without sacrificing quality and reliability. One source of delay and cost in the manufacturing process is the electrical connections which must be made in the motor. Electronically commutated motors have leads from the windings connected to one or more circuit boards which mount control and power circuitry for energizing the windings. Typically, crimp leads are attached to the magnet wires and a connector block or other suitable connector is mounted on the circuit board. The crimp leads are then attached to the connector block on the circuit board. These connecting steps require significant time to carry out during the assembly process. In addition, the circuit board itself must be mounted on the motor housing which requires fastening steps, also taking time to accomplish.

In addition to making the connection of the winding leads, it is necessary to position a sensor, such as a Hall device, for detecting the position of the rotor and making the appropriate electrical connections to the circuit board. A Hall device must be at least partially located between the stator and the rotor in the air gap. The air gap is as small as practicable so the Hall device must be precisely and securely located to avoid being hit by the rotor as it turns. Moreover, it is necessary that the circuit board be electrically insulated from the windings (other than where the windings are attached to the circuit board) and the motor housing. However, there is a need to be able to accomplish the insulation rapidly without employing additional motor components.

Another aspect of motor operation is that circuit board and windings need to be cooled during operation. In order to remove heat a fan can be attached to the rotor shaft to rotate with the rotor and move air through the motor housing. However, a fan generates mechanical noise which detracts from the otherwise quiet operation of the motor. The rotor usually turns at very high speed (e.g., 16,000 rpm), at least in one direction. The high speed exacerbates the problem of fan noise.

SUMMARY OF THE INVENTION

Among the several objects and features of the present invention may be noted the provision of a dynamoelectric machine which permits rapid and secure connection of windings to a power source; the provision of such a dynamoelectric machine which permits rapid and secure mounting of a circuit board; the provision of such a dynamoelectric machine which permits snap on mounting of the circuit board; the provision of such a dynamoelectric machine which orients the circuit board precisely; the provision of such a dynamoelectric machine which electrically insulates the circuit board and windings; the provision of such a dynamoelectric machine which permits quick and precise location of rotor position sensing devices; the provision of such a dynamoelectric machine which does not require a second enclosure for the circuit board; and the provision of such a dynamoelectric machine which is capable of rapid and relatively inexpensive manufacture.

A dynamoelectric machine of the present invention comprises a stator including a stator core of magnetically permeable material having a central bore and at least one winding on the stator core. The winding is formed of wire and has leads for connecting the winding to a power source. A rotor received in the central bore and includes a shaft which is rotatably mounted on support structure on which the stator is also mounted. The rotor and rotor shaft rotate upon selective energization of the winding. Generally, the stator further comprises an end cap attached to an axial end of the stator core. The end cap has a wire fixture formed therein and receiving a segment of the wire from the winding lead, near its terminal end to hold the winding lead.

In another aspect of the present invention, a dynamoelectric machine has a stator core, rotor and windings generally as set forth above. A circuit board having circuitry thereon for controlling operation of the dynamoelectric machine is provided. An end cap of the stator, attached to an axial end of the stator core, has connector means for mounting the circuit board on the end cap.

Other objects and features of the present invention will be in part apparent and in part pointed out hereinafter.

BRIEF DESCRIPTION OF THE DRAWINGS

FIG. 1 is a schematic, longitudinal section of an electric motor taken as indicated by line 1—1 of FIG. 2;

FIG. 2 is a plan view of a stator end cap located on the right end of a stator core of the motor as shown in FIG. 1;

FIG. 3 is an enlarged, fragmentary section taken in the plane including line 3—3 of FIG. 2, but also illustrating a fragmentary portion of a circuit board not shown in FIG. 2;

FIG. 4A is an enlarged fragmentary view as seen from the vantage indicated by line 4A—4A of FIG. 2 and showing the circuit board and a guide pin of the end cap as received in an opening in the circuit board;

FIG. 4B is a fragmentary elevation as seen from the vantage indicated by line 4B—4B of FIG. 2 and illustrating a clamp bolt and windings in phantom;

FIG. 5 is an enlarged, fragmentary plan view of a wire fixture as shown in FIG. 2 and showing a winding lead received in the fixture in phantom;

FIG. 6 is a cross section of the wire fixture taken in the plane including line 6—6 of FIG. 5;

FIG. 7 is an enlarged fragmentary section of the end cap and circuit board similar to FIG. 6, but showing connection of a winding lead to the circuit board;

FIG. 8 is an enlarged fragmentary plan view of two teeth of the end cap of FIG. 2 having pockets for receiving Hall devices;

FIG. 9 is a schematic, radially inner end elevation of the two teeth of FIG. 8;

FIG. 10 is a plan view of a fan of a first embodiment;

FIG. 11 is a plan view of a fan of a second embodiment;

FIG. 12 is a plan view of a stator end cap mounted on the left end of the stator as seen in FIG. 1.

Corresponding reference characters indicate corresponding parts throughout the several views of the drawings.

DETAILED DESCRIPTION OF THE PREFERRED EMBODIMENTS

Referring now to the drawings and specifically to FIG. 1, a dynamoelectric machine in the form of an electric motor is generally indicated at 20. The motor comprises a stator, generally indicated at 22, including a stator core 24 formed from a stack of laminations made of a highly magnetically permeable material, and a winding 26 of magnet wire wound on the stator core in the way known to those of ordinary skill in the art. There may be multiple windings on the stator core, but for the purposes of the present discussion only the single winding 26 will be referenced. The winding 26 has leads 26A, 26B at its terminal ends capable of connection to a power source external of the motor 20, as will be described more fully hereinafter.

A rotor generally indicated at 28 includes a rotor core 30 formed from a stack of laminations of highly magnetically permeable material is substantially received in a central bore of the stator core 24. The rotor 28 and the stator 22 are illustrated as being solid in FIG. 1 for simplicity, their construction being well known to those of ordinary skill in the art. Permanent magnets 32 are mounted on the circumference of the rotor core 30, such as in the manner disclosed in co-assigned U.S. patent application Ser. No. 08/791,116, filed Jan. 30, 1997, which is incorporated herein by reference. More specifically, there are three permanent magnets 32 in the illustrated embodiment, each having a generally arcuate shape extending over about 120°. The permanent magnets 32 and the rotor core 30 are disposed within a tubular sleeve 34 which is bent over at its ends against the rotor core to secure the permanent magnets on the rotor core. The permanent magnets 32 overhang one end of the rotor core 30 to facilitate rotor position sensing. However, it is to be understood that permanent magnets may be mounted other than as shown, and do not have to overhang either end of the rotor core to fall within the scope of the present invention.

A rotor shaft 36 extends through the rotor core 30 and is fixedly attached to the rotor core for conjoint rotation with the rotor core. The ends of the rotor shaft 36 are received in respective ball bearings 40 mounted on support structure of the motor 20 to permit rotation of the rotor 28 relative to the support structure and the stator 22 upon selective energization of the winding 26. The stator core 24 is fixedly mounted on the support structure. In the preferred embodiment, the support structure comprises a motor enclosure including a right end frame 42, a left end frame 44 and a cylindrical shell 46 extending between the end frames. Four clamp bolts 48 (only two are shown) extend through the interior of the shell 46 from one end frame 42 to the other end frame 44, interconnecting the end frames and clamping the motor enclosure components together. The bearings 40 are mounted in respective bearing receptacles 49 formed in the right and left end frames 42, 44. A fan indicated generally at 50 is mounted on the rotor shaft 36 for conjoint rotation with the shaft. The fan 50 draws cooling air through air inlet vent holes 52 in the shell 46 on the right end margin, and exhausts air through air outlet vent holes 54 in the left end margin of the shell.

The stator 22 includes a right end cap and a left end cap (designated generally at 58 and 60, respectively) mounted on the stator core 24. The end caps 58, 60 are made of an electrically insulating material (e.g., GE VALOX DR51 or other suitable material) which is capable of being molded into shape. Referring now also to FIGS. 2 and 12, the end caps 58, 60 generally correspond in shape to the stator core 24, having an annular ring 58A, 60A defining a central opening and teeth 58B, 60B projecting from the periphery of the central opening into the opening. Small posts (not shown) integrally formed on the undersides of the end caps 58, 60 are received in corresponding holes (not shown) in the stator core 24 in which they are held by a friction fit. The winding 26 is wrapped around the stator core teeth (not shown) and also the teeth 58B, 60B of the end caps, and fixes the end caps to the stator core 24. At the free end of each tooth 58B, 60B on both end caps, there is an axially outwardly extending wall 58C, 60C. At the base of the teeth 58B, 60B is an annular wall 58D, 60D formed in the ring 58A, 60A and extending around the circumference of the central opening. The walls (58C, 60C and 58D, 60D) on each tooth 58B, 60B are in opposed relation and cradle the winding 26 between them as they extending around the end cap teeth and hold the turns of the winding in position.

A circuit board, generally indicated at 64, mounting circuitry for operating the motor 20 is annular in shape, having a central opening 66 receiving the rotor shaft 36 through the circuit board (FIG. 1). The circuitry may include conventional components (e.g., components 68) and is shown only in simplified form, because its general construction and operation is well understood by those of ordinary skill in the art. The circuit board 64 is mounted on the motor 20 solely by the right end cap 58, and is held in spaced relation from the shell 46. More specifically, the right end cap 58 has five fingers 72 formed as one piece with the end cap and extending axially outwardly from the ring 58A of the end cap further than any other end cap component. The fingers 72 are located at angularly spaced apart locations around the end cap 58. As shown in FIG. 3, the fingers 72 each have a generally wedge shaped tip 74, which tapers toward the free end of the finger and has a shoulder 76 on its axially inner end, on the radially inner side of the finger.

The right end cap 58 has an axially outwardly facing shoulder 78 located in opposed relation with the shoulders 76 on the tips 74 of the fingers 72. Projecting axially outward from the radial periphery of the shoulder 78 is an annular shield 80 having a height somewhat greater than the thickness of the circuit board 64. Thus when assembled, the circuit board is pushed axially inward against the tips 74 of the fingers 72. The wedge shape of the finger tips 74 permits the board to resiliently bend all of the fingers 72 simultaneously radially outwardly from their relaxed positions. The circuit board 64 moves inwardly until it engages the shoulder 78 on the end cap 58. At approximately the same moment the circuit board 64 engages the shoulder 78, it clears the axially inner ends of the tips 74, allowing the fingers 72 to snap back toward their relaxed positions and bringing the shoulders 76 of the tips over the outer surface of the circuit board. Thus, the circuit board 64 is held on the end cap 58 between the shoulder 78 on the ring of the end cap and the shoulders 76 on the axially inner ends of the finger tips 74. No other fasteners are used to secure the circuit board 64 to the stator core 24 or to the shell 46. The annular shield 80 of the end cap 58 is substantially everywhere located between the circuit board 64 and the shell 46, and spaces the circuit board from the shell so that the circuit board is electrically insulated from the shell. It is noted that there are discontinuities in the shield 80, and also in the shoulder 78, but that these components extend substantially all the way around the end cap 58.

Three guide pins 82A, 82B, 82C, formed as one piece with the end cap 58 help to make certain that the circuit board 64 is put on the stator 22 in the correct orientation. Referring to FIG. 2, two of the guide pins (82A, 82B) are circular in cross section and are received in generally semi-circular slots (not shown) in the periphery of the circuit board 64. The other guide pin 82C has a rectangular cross section and is received in a rectangular slot in the periphery of the circuit board 64 (FIG. 4A). The arrangement of the three pins 82A–82C permits the circuit board 64 to fit onto the right end cap 58 in only one angular orientation. The rectangular pin 82C, along with the rectangular slot in the circuit board 64, give a quick visual indication of the correct orientation of the circuit board on the end cap 58. In the final motor assembly (FIG. 1), the circuit board 64 is enclosed from the exterior of the motor 20 only by the end frames 42, 44 and shell 46. The shell 46 receives the stator 22, the rotor core 30 and the circuit board 64 within it. The end frames 42, 44 close open ends of the cylindrical shell 46 to enclose the stator 22, rotor core 30, end caps 58, 60 and circuit 64. Thus, no separate enclosure for the circuit board 64 is required.

At the same time the circuit board 64 is secured by snap on connection to the end cap 58, the winding 26 is plugged into the circuitry 68 of the circuit board. To that end, the end cap 58 has wire fixtures, generally indicated at 86, formed in the end cap for holding the winding leads 26A, 26B of the winding 26. Referring now to FIGS. 2 and 5–7, the wire fixtures 86 each include a radially extending channel 88 having a width sized to firmly hold, as by a friction fit, a segment of one of the winding leads 26A, 26B. A pocket 90 extends transversely across the channel 88. A holding post 92 formed integrally with the end cap 58 extends radially outwardly from the end cap in registration with the channel 88 (as seen in the top plan views). After the stator core 24 is wound, one of the winding leads (e.g., winding lead 26A) is placed in the channel 88 and extends entirely through the channel. The end portion of the winding lead 26A is wrapped around the holding post 92 (as illustrated in FIG. 5) to temporarily secure the winding 26 in the wire fixture 86.

The circuit board 64 has a pair of terminals 94 (only one is shown) which are attached by solder 96 to the circuit board. The terminals 94 are of the insulation piercing type which can cut through the magnet wire insulation upon insertion of the magnet wire into the terminal to make electrical contact with the magnet wire of the winding lead (26A, 26B) in the wire fixture 86 (FIG. 7). In the preferred embodiment, the terminals 94 are soldered onto to the circuit board 64. When the circuit board is secured to the end cap 58, as described above, the terminals 94 are received in respective pockets 90 astride the channels 88.

An outwardly flaring mouth 98 of the pocket 90 helps to guide the terminal 94 into the pocket. Continued movement of each terminal 94 into its respective pocket 90 causes the winding lead (e.g., lead 26A) to be received between the two prongs 94A, 94B of each terminal, stripping the insulation from the magnet wire and achieving electrical connection of the wire to the terminals. Splines 94C on the prongs 94A, 94B dig into the walls of the pocket 90 to prevent withdrawal of the terminal 94 from the pocket. The circuitry of the circuit board 64 includes a connector (not shown) electrically connected to the terminals 94 and positioned for plugging into an external power source. The channel 88 and holding posts 92 fix the winding lead 26A in position to permit the terminal 94 to penetrate the insulation of the magnet wire. The pocket 90 also holds and guides (by its flared mouth 98) the terminal 94 to permit the electrical connection to occur. The holding posts 92 are sheared off of the end cap 58 after connection of the winding leads 26A, 26B to the circuit board terminals 94 is complete (or concurrently with the connection), so that the terminals now hold the winding leads in the wire fixture 86.

Also at the same time the circuit board 64 is being attached to the end cap 58, rotor position sensors in the form of two Hall devices 100, 102, are positioned partially in the air gap between the stator 22 and rotor 28. Referring to FIGS. 1, 8 and 9, the Hall devices 100, 102 are soldered to the circuit board 64 and project axially inwardly from the circuit board. A Hall device holder 104 of polymeric material is also attached to the circuit board 64 and sheaths the Hall devices 100, 102 to protect them. The holder 104 has two barrels, one for each Hall device, and three tabs 106 (only two are shown) which are received through openings in the circuit board 64 and welded to the circuit board.

Two of the teeth of the right stator end cap 58 (designated 58B' and 58B", respectively) are constructed to receive and hold respective barrels of the Hall device holder 104 (and the Hall devices 100, 102 disposed in the barrels). More specifically, the teeth 58B', 58B" have pockets 108, 110 formed therein sized to receive and hold portions of respective barrels. Mouths 112, 114 of the pockets 108, 110 flare outwardly to facilitate locating the barrels in the pockets, and guide the barrels into the pockets as the circuit board 64 is pushed onto the end cap 58. As received in the pockets 108, 110, the Hall devices 100, 102 are precisely located for detecting the position of the rotor 28. In addition, pockets 108, 110 make certain that the Hall device holder 104 does not interfere with the rotation of the rotor 28.

The stator end caps 58, 60 also function to insulate the windings from the clamp bolts 48 extending through the motor 20. As shown in FIG. 2, the right end cap 58 has four generally U-shaped slots 118 in its periphery. These slots 118 receive the clamp bolts 48 through the end cap 58, and are aligned with corresponding slots (not shown) in the stator core 24. The magnet wire of the winding 26 extending around the teeth 58B of the end cap 58 should not touch the clamp bolts 48 to avoid inadvertent grounding of the winding. To that end, there are bolt guards 120 projecting axially outwardly from the end cap 58 at the base of each of four teeth 58B (including tooth 58B') which are aligned with a corresponding ones of the U-shaped clamp bolt slots 118. The bolt guards 120 are formed as one piece with the end cap 58, and hence are made of the same electrically insulating material as the rest of the end cap. As illustrated in FIG. 4B, the bolt guards 120 are interposed between the winding 26 around the tooth 58B, and the clamp bolt 48. Thus, the clamp guard 120 separates and electrically insulates the clamp bolt 48 from the winding 26. As shown in FIG. 12, the left stator end cap has similar U-shaped slots 122 and bolt guards 124.

As shown in FIG. 10, the fan 50 fixedly attached to the rotor shaft has backwardly curved fan blades 128. The "backward" curvature is in relation to a first direction of rotation for high speed operation of the motor 20 indicated by arrow H in FIG. 10. As an example, in a washing machine the motor 20 operates at its highest speed during the spin cycle and may reach about 16,000 rpm. Although the motor 20 does also operate in the opposite direction in the example of the washing machine, it does not exceed about 800 rpm when rotating in that direction. The fan 50 is particularly designed to operate quietly in the high speed direction. The fan 50 comprises a flat, circular mounting member 130, and the fan blades 128 are mounted on the mounting member at spaced apart locations around the mounting member. The fan blades 128 curve radially inwardly from the periphery of the mounting member 130 and in the first direction H to an apex (i.e. the point A on the blade most advanced in the first direction). From the apex A, the fan blade 128 curves radially inwardly and in a direction opposite the first direction such that each fan blade has a backward curvature relative to the first direction of rotation H. The backward curvature of the fan blades 128 permits the fan 50 to generate very little noise as it rotates at high speed in the first direction H. However, the high speed still produces sufficient air movement by the fan 50 to keep the circuit board 64, stator 22 and rotor 28 cooled in operation. Although rotation in the opposite direction would produce additional noise, the rotation in this direction is less frequent and at such considerably lower speeds that the noise level is not significant.

The fan 50 is positioned so that air is drawn in through the air inlet vent holes 52 on the right side of the shell 46 (as shown in FIG. 1). Only two of the air inlet vent holes 52 are shown in FIG. 1. In the preferred embodiment, there are regularly spaced holes around the circumference of the shell 46 at the right end, and a similar number of the air outlet vent holes 54 on the left end of the shell. The air drawn into the shell 46 passes first over the circuit board 64 to extract heat first from the circuitry 68 on the board. The circuit board 64 is the most sensitive to heat and so receives the coolest air. Thereafter, the air passes between and around the stator 22 and rotor 28, and additional heat is drawn off these items. The air is then forced by the fan 50 out of the air outlet vent holes 54 on the left side of the shell 46.

As shown in FIG. 12, a fan 250 of a second embodiment has a mounting member 230 and fan blades 228. The fan blades 228 have a more gentle curve and a greater radial extent that the fan blades 128 of FIG. 11. It is contemplated that either of the embodiments of the fan (50, 250) may be used with good effect in the motor 20 of the present invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A dynamoelectric machine comprising a stator including a stator core of magnetically permeable material having a central bore and at least one winding on the stator core, the winding being formed of wire and having winding leads at its terminal ends for connecting the winding to a power source, a rotor received in the central bore and including a shaft, a circuit board having circuitry thereon for use in operating the dynamoelectric machine, the circuitry including an insulation displacement terminal integrally mounted thereon, and support structure on which the stator is mounted and the rotor shaft is mounted for rotation relative to the support structure and the stator upon selective energization of the winding, the stator further comprising an end cap attached to an axial end of the stator core, the end cap having a wire fixture formed therein and receiving a segment of the wire from the winding generally adjacent to one of the winding leads to hold the winding lead, the insulation displacement terminal of the circuit board being received in the wire fixture in electrical contact with the winding lead in the fixture.

2. A dynamoelectric machine as set forth in claim 1 wherein the wire fixture comprises a channel formed in the end cap and a terminal pocket extending transversely across the channel.

3. A dynamoelectric machine as set forth in claim 2 wherein the circuit board is generally annular in shape and receives the rotor shaft through a central opening of the circuit board.

4. A dynamoelectric machine as set forth in claim 3 further comprising an enclosure for substantially enclosing the stator, rotor, end cap and circuit board, the enclosure defining a boundary between an interior of the dynamoelectric machine and an exterior of the machine, the enclosure being the sole enclosure separating the circuit board from the exterior of the dynamoelectric machine.

5. A dynamoelectric machine as set forth in claim 1 wherein the end cap comprises connector means for mounting the circuit board on the end cap.

6. A dynamoelectric machine as set forth in claim 5 wherein said connector means is constructed for snap on connection of the circuit board to the end cap.

7. A dynamoelectric machine as set forth in claim 6 wherein said connector means comprises spaced apart fingers formed integrally with the end cap and projecting axially outwardly from the end cap, the fingers having generally wedge shaped tip portions at their free ends, and being resiliently flexible for snapping the tip portions over an edge of the circuit board thereby to connect the circuit board to the end cap.

8. A dynamoelectric machine as set forth in claim 7 wherein the end cap is generally annular in shape and the rotor shaft passes through a central opening of the end cap, the end cap having an annular shoulder engaging the circuit board axially inwardly of the tip portions of the fingers whereby the circuit board is held between the tip portions and shoulder.

9. A dynamoelectric machine as set forth in claim 8 wherein the end cap further comprises an annular shield formed integrally with the end cap of electrically insulating material, the shield projecting axially outwardly from the shoulder and surrounding the circuit board is disposed between an exterior of the machine and the circuit board for electrically insulating the circuit board.

10. A dynamoelectric machine as set forth in claim 5 wherein said connector means comprises guide pins projecting axially outwardly from the end cap, the circuit board having corresponding openings therein receiving the guide pins, the guide pins and the circuit board openings being arranged such that the guide pins are received in the openings in only a single predetermined orientation of the end cap and the circuit board relative to each other.

11. A dynamoelectric machine as set forth in claim 1 further comprising a circuit board having circuitry thereon for use in operating the dynamoelectric machine, and wherein the end cap is generally annular in shape and the rotor shaft extends through a central opening of the end cap, the end cap having teeth projecting radially inwardly from the periphery of the central opening of the end cap, one of the teeth having a pocket formed therein, the circuit board including a Hall device connected to the circuitry and projecting axially inwardly from the circuit board and into the pocket on said one tooth of the end cap.

12. A dynamoelectric machine as set forth in claim 11 further comprising a holder for the Hall device mounted on the circuit board and substantially enclosing the Hall device, a portion of the holder being received into the pocket on said one tooth of the end cap.

13. A dynamoelectric machine as set forth in claim 11 wherein another of the teeth of the end cap has a pocket formed therein, the circuit board including another Hall device received in the pocket formed on said other tooth.

14. A dynamoelectric machine as set forth in claim 13 wherein the pockets formed in said one tooth and said other tooth of the end cap are shaped for guiding the Hall devices into the respective pockets upon assembly of the circuit board with the end cap.

15. A dynamoelectric machine as set forth in claim 1 further comprising an enclosure for substantially enclosing the stator, rotor and end cap, the enclosure including first and second end frames and clamp bolts extending between and interconnecting the end frames, and wherein the end cap is generally annular in shape and the rotor shaft extends through a central opening of the end cap, the end cap having teeth projecting radially inwardly from the periphery of the central opening of the end cap, the wire of the winding being wound around at least some of the teeth of the end cap, the end cap further including a wire guard for each of said clamp bolts, each wire guard projecting axially from the end cap adjacent the central opening at a fixed end of one of the teeth, the wire guard being interposed between the winding and one of the clamp bolts for use in electrically insulating the clamp bolt from the windings.

16. A dynamoelectric machine as set forth in claim 1 further comprising a fan mounted on the rotor shaft for conjoint rotation therewith in a first direction corresponding to the direction of highest speed operation of the dynamoelectric machine, the fan comprising a mounting member and fan blades mounted on the mounting member at spaced apart locations around the mounting member, the fan blades each curving radially inwardly from the periphery of the mounting member and in the first direction to an apex, and thence curving radially inwardly and in a direction opposite the first direction such that each fan blade has a backward curvature relative to the first direction of rotation.

17. A dynamoelectric machine as set forth in claim 16 further comprising a circuit board having circuitry thereon for use in operating the dynamoelectric machine, and an enclosure for substantially enclosing the stator, rotor, end cap, circuit board and fan, the enclosure having an air inlet vent adjacent a first end thereof and an air outlet vent adjacent a second end, the circuit board being disposed adjacent the first end of the enclosure and the fan being disposed adjacent the second end of the enclosure and constructed for drawing air through the air inlet vent upon rotation in the first direction, over the circuit board, stator and rotor, and exhausting the air through the air outlet vent.

18. A dynamoelectric machine comprising a stator including a stator core of magnetically permeable material having a central bore and at least one winding of wound wire on the stator core, a rotor received in the central bore and including a shaft, and support structure on which the stator is mounted and the rotor shaft is mounted for rotation relative to the support structure and the stator upon selective energization of the winding, a circuit board having circuitry thereon for use in operating the dynamoelectric machine, the stator further comprising an end cap attached to an axial end of the stator core, the end cap comprises connector means for mounting the circuit board on the end cap, said connector means being formed as one piece with the end cap and constructed for snap on connection of the circuit board to the end cap, said connector means holding the circuit board against the end cap whereby the circuit board is held in place solely by the end cap.

19. A dynamoelectric machine as set forth in claim 18 wherein said connector means comprises spaced apart fingers formed integrally with the end cap and projecting axially outwardly from the end cap, the fingers having generally wedge shaped tip portions at their free ends, and being resiliently flexible for snapping the tip portions over an edge of the circuit board thereby to connect the circuit board to the end cap.

20. A dynamoelectric machine as set forth in claim 19 wherein the end cap is generally annular in shape and the rotor shaft passes through a central opening of the end cap, the end cap having an annular shoulder engaging the circuit board axially inwardly of the tip portions of the fingers whereby the circuit board is held between the tip portions and shoulder.

21. A dynamoelectric machine as set forth in claim 20 wherein the end cap further comprises an annular shield formed integrally with the end cap of electrically insulating material, the shield projecting axially outwardly from the shoulder and surrounding the circuit board for electrically insulating the circuit board.

22. A dynamoelectric machine as set forth in claim 18 wherein the end cap has a wire fixture formed therein and receiving a segment of the wire from the winding lead adjacent to a terminal end of the wire to hold the wire, the wire fixture comprising a channel formed in the end cap and a terminal pocket extending transversely across the channel, the circuitry on the circuit board including an insulation displacement terminal mounted on the circuit board and received in the terminal pocket, the terminal being in electrical contact with the winding lead in the wire fixture.

23. A dynamoelectric machine as set forth in claim 18 wherein the end cap is generally annular in shape and the rotor shaft extends through a central opening of the end cap, the end cap having teeth projecting radially inwardly from the periphery of the central opening of the end cap, one of the teeth having a pocket formed therein, the circuit board including a Hall device connected to the circuitry and projecting axially inwardly from the circuit board and into the pocket on said one tooth of the end cap.

24. A dynamoelectric machine as set forth in claim 23 further comprising a holder for the Hall device mounted on the circuit board and substantially enclosing the Hall device, a portion of the holder being received into the pocket on said one tooth of the end cap.

25. A dynamoelectric machine as set forth in claim 24 wherein another of the teeth of the end cap has a pocket formed therein, the circuit board including another Hall device received in the pocket formed on said other tooth.

26. A dynamoelectric machine as set forth in claim 25 wherein the pockets formed in said one tooth and said other tooth of the end cap are shaped for guiding the Hall devices into the respective pockets upon assembly of the circuit board with the end cap.

27. A dynamoelectric machine as set forth in claim 18 wherein said connector means comprises guide pins projecting axially outwardly from the end cap, the circuit board having corresponding openings therein receiving the guide pins, the guide pins and the circuit board openings being arranged such that the guide pins are received in the openings in only a single predetermined orientation of the end cap and the circuit board relative to each other.

28. A dynamoelectric machine as set forth in claim 18 further comprising an enclosure for substantially enclosing the stator, rotor, end cap and circuit board, the enclosure including first and second end frames and clamp bolts extending between and interconnecting the end frames, and wherein the end cap is generally annular in shape and the rotor shaft extends through a central opening of the end cap, the end cap having teeth projecting radially inwardly from the periphery of the central opening of the end cap, the wire of the winding being wound around at least some of the teeth of the end cap, the end cap further including a wire guard for each of said clamp bolts, each wire guard projecting axially from the end cap adjacent the central opening at a fixed end of one of the teeth, the wire guard being interposed between the winding and one of the clamp bolts for use in electrically insulating the clamp bolts from the windings.

29. A dynamoelectric machine as set forth in claim 18 further comprising a fan mounted on the rotor shaft for conjoint rotation therewith in a first direction corresponding to the direction of highest speed operation of the dynamoelectric machine, the fan comprising a mounting member and fan blades mounted on the mounting member at spaced apart locations around the mounting member, the fan blades each curving radially inwardly from the periphery of the mounting member and in the first direction to an apex, and thence curving radially inwardly and in a direction opposite the first direction such that each fan blade has a backward curvature relative to the first direction of rotation.

30. A dynamoelectric machine as set forth in claim 29 further comprising an enclosure for substantially enclosing the stator, rotor, end cap, circuit board and fan, the enclosure having an air inlet vent adjacent a first end thereof and an air outlet vent adjacent a second end, the circuit board being disposed adjacent the first end and the fan being disposed adjacent the second end of the enclosure and constructed for drawing air through the air inlet vent upon rotation in the first direction, over the circuit board, stator and rotor, and exhausting the air through the air outlet vent.

31. A dynamoelectric machine comprising a stator including a stator core of magnetically permeable material having a central bore and at least one winding on the stator core, the winding being formed of wire and having winding leads at its terminal ends, a rotor received in the central bore and including a shaft, a circuit board for controlling operation of the dynamoelectric machine, the winding leads being electrically connected to the circuit board, and support structure on which the stator is mounted and the rotor shaft is mounted for rotation relative to the support structure and the stator upon selective energization of the winding, the support structure enclosing the stator, rotor and circuit board and defining a boundary between an interior of the dynamoelectric machine and an exterior of the machine, the support structure being the sole enclosure separating the circuit board from the exterior of the dynamoelectric machine.

32. A dynamoelectric machine as set forth in claim 31 wherein support structure comprises a cylindrical shell in which the stator, rotor core and circuit board are received and a pair of end frames closing open ends of the shell.

33. A stator end cap for a stator of a dynamoelectric machine, the stator including a stator core of magnetically permeable material and at least one winding on the stator core, the end cap including a wire fixture formed in the body to receive a segment of wire from the winding generally adjacent to one of the winding leads to hold the winding lead, the end cap being sized and shaped for mounting on the stator core, and a frangible holding post formed integrally with the end cap and extending radially outwardly from the end cap in proximity to the channel for temporarily securing one of the winding leads.

* * * * *